United States Patent
Luce

(10) Patent No.: US 11,536,306 B2
(45) Date of Patent: Dec. 27, 2022

(54) ATTACHMENT OF COMPOSITE LUG TO COMPOSITE STRUCTURAL TUBE

(71) Applicant: Goodrich Corporation, Charlotte, NC (US)

(72) Inventor: William E. Luce, Colleyville, TX (US)

(73) Assignee: Goodrich Corporation, Charlotte, NC (US)

(*) Notice: Subject to any disclaimer, the term of this patent is extended or adjusted under 35 U.S.C. 154(b) by 3 days.

(21) Appl. No.: 17/192,451

(22) Filed: Mar. 4, 2021

(65) Prior Publication Data

US 2021/0190110 A1    Jun. 24, 2021

Related U.S. Application Data

(62) Division of application No. 15/829,394, filed on Dec. 1, 2017, now Pat. No. 10,968,933, which is a division of application No. 14/720,359, filed on May 22, 2015, now Pat. No. 9,897,122.

(51) Int. Cl.
| | |
|---|---|
| *B64C 25/10* | (2006.01) |
| *F16B 5/12* | (2006.01) |
| *B64C 25/60* | (2006.01) |
| *B29C 70/68* | (2006.01) |
| *B29C 70/84* | (2006.01) |
| *B29L 31/30* | (2006.01) |

(52) U.S. Cl.
CPC ............ *F16B 5/125* (2013.01); *B29C 70/682* (2013.01); *B29C 70/683* (2013.01); *B29C 70/84* (2013.01); *B64C 25/10* (2013.01); *B64C 25/60* (2013.01); *B29K 2715/00* (2013.01); *B29L 2031/3076* (2013.01)

(58) Field of Classification Search
CPC ..... F16B 5/125; B29C 70/682; B29C 70/683; B29C 70/84; B64C 25/10; B64C 25/60; B29K 2715/00; B29L 2031/3076
See application file for complete search history.

(56) References Cited

U.S. PATENT DOCUMENTS

| | | | |
|---|---|---|---|
| 1,298,625 A | 3/1919 | Zimmermann | |
| 2,720,016 A | 10/1955 | Johannsen | |
| 2,913,790 A | 11/1959 | Meisen | |

(Continued)

FOREIGN PATENT DOCUMENTS

| | | |
|---|---|---|
| CA | 2844766 | 2/2013 |
| EP | 1005697 | 6/2000 |

(Continued)

OTHER PUBLICATIONS

Extended European Search Report dated Sep. 27, 2016 in European Application No. 16170356.6.

(Continued)

*Primary Examiner* — Rick K Chang
(74) *Attorney, Agent, or Firm* — Snell & Wilmer L.L.P.

(57) ABSTRACT

A landing gear system includes a composite tube. The composite tube comprises at least one of (i) a filament wound composite tube, (ii) a filament braided tube, and (iii) a composite tube of laid up filament. The landing gear system further comprises a first lug cluster mounted to the composite tube and a second lug cluster mounted to the composite tube. The first lug cluster and the second lug cluster are oriented at an angle to one another.

9 Claims, 14 Drawing Sheets

(56) References Cited

U.S. PATENT DOCUMENTS

| | | |
|---|---|---|
| 3,633,250 A | 1/1972 | Romney |
| 4,740,100 A | 4/1988 | Saarela et al. |
| 5,019,312 A | 5/1991 | Bishop |
| 5,122,210 A | 6/1992 | Kubomura et al. |
| 5,211,359 A | 5/1993 | Rene et al. |
| 5,224,669 A | 7/1993 | Guimbal |
| 5,368,324 A | 11/1994 | Kaim |
| 5,746,861 A | 5/1998 | Mandon |
| 6,193,436 B1 | 2/2001 | Ellis |
| 7,601,288 B2 | 10/2009 | Dunleavy |
| 8,753,465 B2 | 6/2014 | Masson et al. |
| 9,415,863 B2 | 8/2016 | Leclercq et al. |
| 9,897,122 B2 | 2/2018 | Luce |
| 10,968,933 B2 | 4/2021 | Luce |
| 2004/0061302 A1 | 4/2004 | Parlee |
| 2007/0007386 A1 | 1/2007 | Coupe et al. |
| 2007/0152105 A1 | 7/2007 | Filsinger et al. |
| 2010/0006698 A1 | 1/2010 | Steinke et al. |
| 2011/0308702 A1* | 12/2011 | Serey .............. D03D 11/02 156/152 |
| 2013/0068900 A1 | 3/2013 | Heath |
| 2013/0295302 A1 | 11/2013 | Godon et al. |
| 2014/0093309 A1 | 4/2014 | Fleischer |
| 2014/0154458 A1 | 6/2014 | Zilberman et al. |
| 2014/0225297 A1 | 8/2014 | Richard et al. |
| 2014/0283974 A1 | 9/2014 | Masson et al. |
| 2021/0190110 A1 | 6/2021 | Luce |

FOREIGN PATENT DOCUMENTS

| | | |
|---|---|---|
| EP | 2409916 | 1/2012 |
| EP | 3095694 | 11/2016 |
| EP | 3415420 | 12/2018 |
| FR | 2565262 | 12/1985 |

OTHER PUBLICATIONS

Restriction Requirement Office Action dated Oct. 3, 2016 in U.S. Appl. No. 14/720,359.

USPTO, Pre-Interview first Office Action dated Apr. 24, 2017 in U.S. Appl. No. 14/720,359.

USPTO, First Action Interview Office Action dated Jun. 9, 2017 in U.S. Appl. No. 14/720,359.

USPTO, Notice of Allowance dated Oct. 5, 2017 in U.S. Appl. No. 14/720,359.

European Patent Office, European Search Report dated Sep. 18, 2018 in Application No. 18186300.2-1010.

USPTO, Non Final Office Action dated Jul. 6, 2020 in U.S. Appl. No. 15/829,394.

USPTO, Notice of Allowance dated Dec. 9, 2020 in U.S. Appl. No. 15/829,394.

Canadian Patent Office; Canadian Office Action and Search Report dated Jan. 25, 2022 in Application No. 2923121.

\* cited by examiner

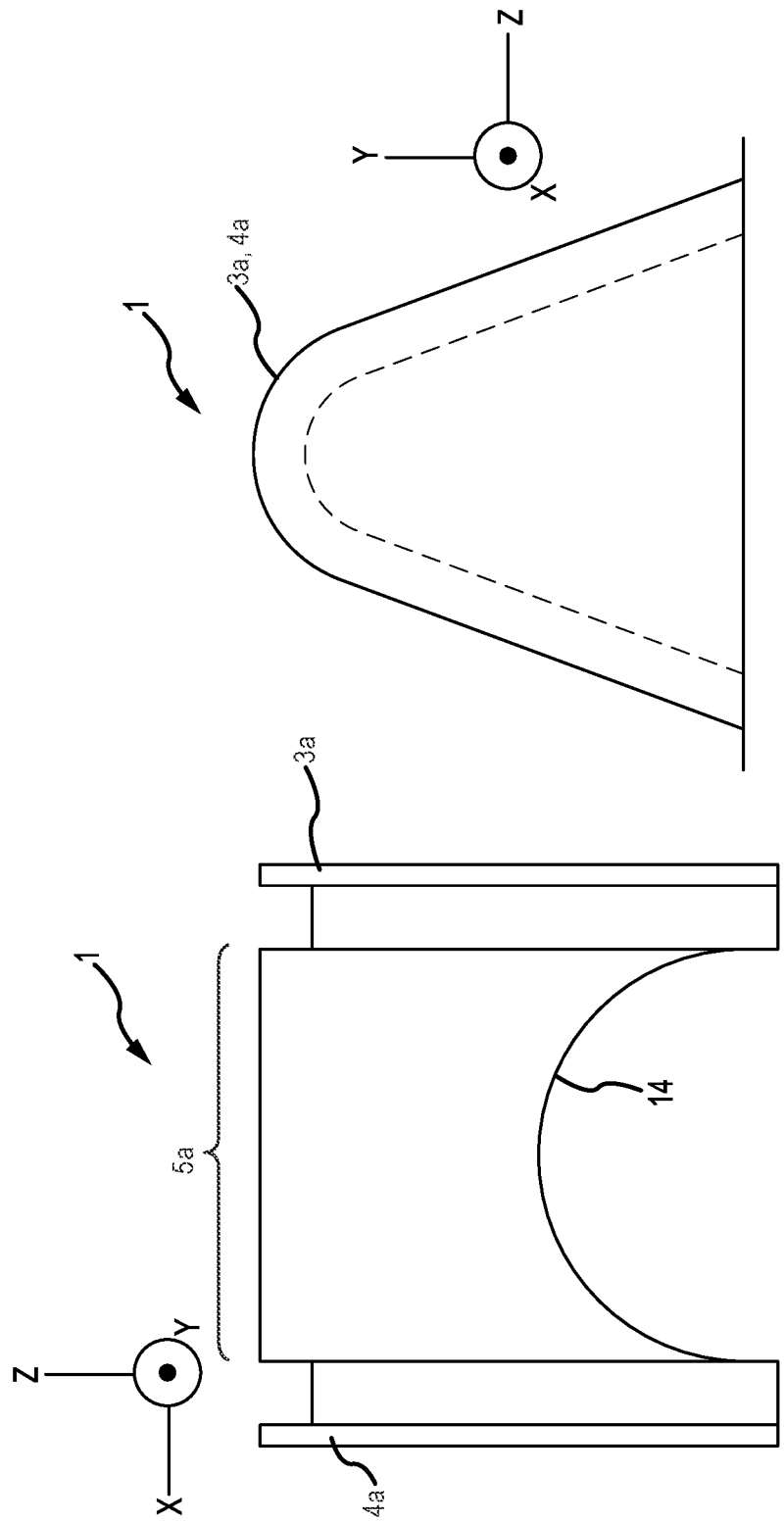

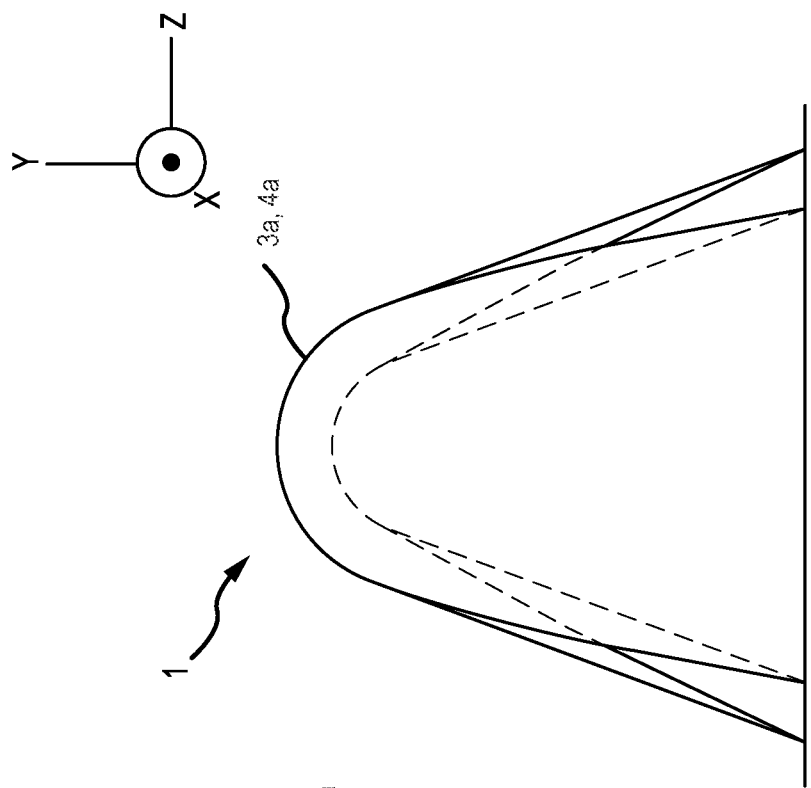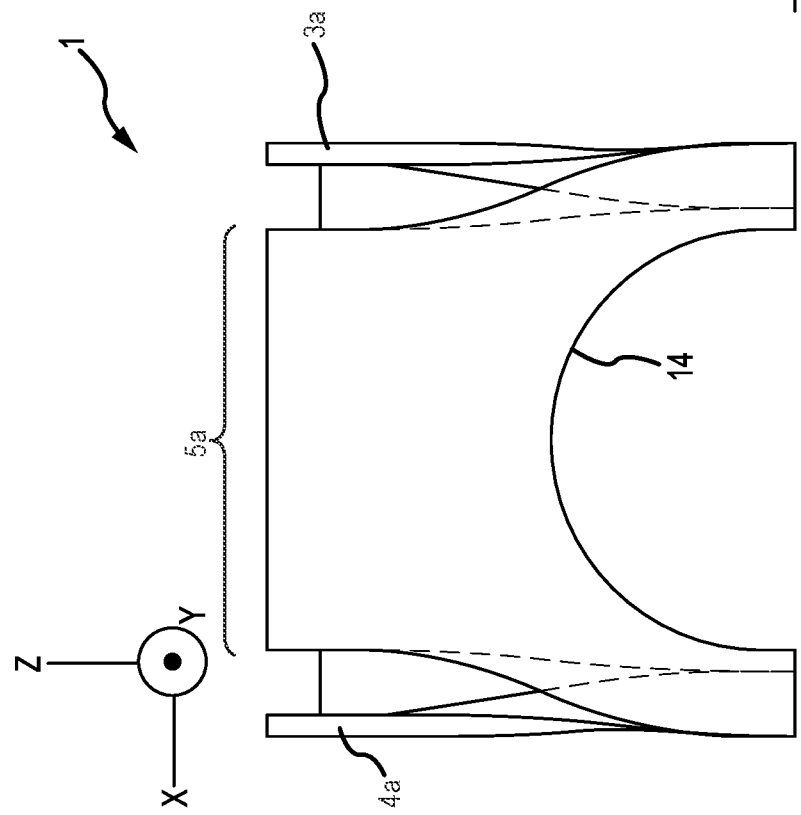

ATTACHMENT OF COMPOSITE LUG TO COMPOSITE STRUCTURAL TUBE

CROSS REFERENCE TO RELATED APPLICATIONS

This application is a divisional of, and claims priority to, and the benefit of U.S. patent application Ser. No. 15/829,394, filed Dec. 1, 2017 and entitled "ATTACHMENT OF COMPOSITE LUG TO COMPOSITE STRUCTURAL TUBE." The '394 application is a divisional of, and claims priority to and the benefit of, U.S. patent application Ser. No. 14/720,359, filed on May 22, 2015, and entitled "ATTACHMENT OF COMPOSITE LUG TO COMPOSITE STRUCTURAL TUBE" (nka U.S. Pat. No. 9,897,122 issued Feb. 20, 2018). Both of the aforementioned are hereby incorporated by reference in their entirety for all purposes.

FIELD

The present disclosure relates generally to lug clusters and more specifically to lug clusters for use with composite tubes.

BACKGROUND

Various types of aircraft utilize tubes such as struts including, for example, to deploy nose, body, and/or wheel landing gear systems. Conventionally, aircraft landing gear include metal tubes and structural components, for example, landing gear strut tubes. Such components are made of metallic materials and often comprise complex geometries and high strengths. However, these metallic components are typically heavy.

SUMMARY

A lug cluster is disclosed in accordance with various embodiments. The lug cluster may include a first side having a flange including a first side groove receiving a fiber filament according to a filament path, a second side having a flange including a second side groove receiving the fiber filament according to the filament path, and a saddle. The saddle may include a floor member having a planar member formed to follow a contour of a composite tube and an upper infill member resting on the floor member and positioned between the first side and the second side.

A method of manufacturing a lug cluster is disclosed in accordance with various embodiments. The method may include forming a first side having a first side including a flange with a first side groove and forming a second side having a flange with a second side groove. The first side and second side are joined together by a saddle having a floor member including a planar member shaped to follow a contour of a composite tube. The method may include wrapping a first filament along a filament path disposed along the first side groove and the second side groove, whereby the lug cluster is secured in compression against the composite tube. The method may further include consolidating the composite tube and the lug cluster by resin transfer molding and forming an upper infill member resting on the floor member and positioned between the first side and the second side. A wrap of fiber, such as a continuous wrap of fiber around the lug and tube secures the lug to the tube and reacts loads that may otherwise pull the lug from the tube.

A landing gear system is disclosed in accordance with various embodiments. The landing gear system may include a composite tube, a first lug cluster mounted to the composite tube, and a second lug cluster mounted to the composite tube. The composite tube may comprise at least one of a filament wound composite tube, a filament braided tube, and a composite tube of laid up filament. In various embodiments, the first lug cluster and the second lug cluster are oriented at an angle to one another.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 3A-B illustrate various views of a lug cluster according to FIG. 2A;

FIGS. 3C-D illustrate various views of a lug cluster according to FIG. 2B;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

The present disclosure describes lug clusters for use with composite structural tubes. Such lug clusters may be used in aircraft systems, such as, for example, landing gear systems.

However, the systems and methods of the present disclosure may be suitable for use in non-aircraft systems as well.

Aircraft landing gear increasingly implement composite features, such as composite strut tubes. While metal strut tubes are typically resilient under side loading, composite strut tubes may implement attached lug clusters whereby side load may be conducted into various supporting structures, rather than through the composite strut tube. Moreover, composite tubes may be used in actuator systems. Various lug clusters may be attached whereby an actuation force exerted by an actuator may be conducted to various structures that are desired to be actuated.

Figure 1:
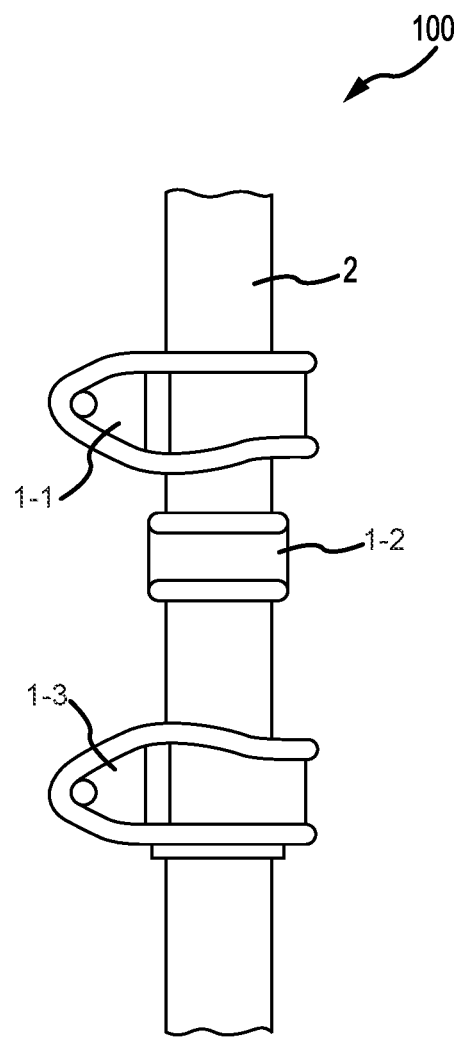
FIG. 1 illustrates a composite structural tube having various lug clusters, in accordance with various embodiments.

A landing gear system may comprise a tube and a lug cluster. With reference to FIG. 1, landing gear system 100 in accordance with various embodiments may comprise multiple lug clusters 1-1, 1-2, and 1-3 attached at different points to the tube 2. Various lug clusters 1-1, 1-2, and 1-3 may have various orientations, for instance, lug clusters 1-1 and/or 1-3 are oriented in a different direction than lug cluster 1-2. Various lug clusters 1-1, 1-2, and 1-3 may attach to the tube 2 at various locations and may extend between the tube 2 and other aircraft structures. The tube 2 may comprise a composite tube. For example, the tube 2 may comprise a filament wound composite tube, a filament braided tube, a composite tube of laid up filament and/or a combination thereof. For example, the composite tube may comprise carbon fiber and/or ceramic materials and/or fiberglass. The composite tube may comprise polyacrylonitrile fibers such as oxidized polyacrylonitrile fibers or carbonized polyacrylonitrile fibers. The composite tube may comprise fibrous structures infiltrated with a thermosetting and/or thermoplastic material and/or resin. The composite tube may comprise lightweight polymer matrix composite such as a carbon fiber composite material or a hydrocarbon fiber composite material. Thus, a landing gear system 100 may comprise a tube 2, first lug cluster 1-1, and a second lug cluster 1-2. The first lug cluster 1-1 and the second lug cluster 1-2 may have different orientations, for instance, oriented at an angle to one another, such as a right angle, or any other angle.

Although composite materials provide reduced weight over traditional metal components, it may be difficult to couple composite materials to metal components. Conventional methods of attaching composite materials to other materials, such as threading or drilling holes in the composite material, may significantly reduce the strength of the composite material. Joining composite materials with metallic components often presents challenges due to different material characteristics. Joining composite materials with to other composite materials also may present challenges. In that regard, it may not be suitable to couple a metallic lug cluster to a composite tube using traditional methodologies. As described herein, a fibrous member may be used to load a lug cluster 1 in compression with a composite tube 2. Thus, the fibrous member may couple the lug cluster 1 to the tube in a manner in which the lug cluster 1 is able to bear a load in any direction.

With reference to FIGS. 2A, 2B, 3A, 3B, 3C, and 3D, a lug cluster 1 may comprise a first side 3a, a second side 4a and a saddle 5a. The saddle 5a may rest in surface-to-surface contact against the outer surface of the tube 2 forming a cylinder section with a profile lying in the X-Y plane and an axis extending in the Z-direction. The first side 3a and the second side 4a may be disposed at opposite ends of the saddle 5a along the X-axis and may extend outwardly from the saddle 5a along Y-axis and lying in the Y-Z plane. In various embodiments, the first side 3a and the second side 4a extend along parallel tangents of the surface of the tube 2.

Figure 2A:
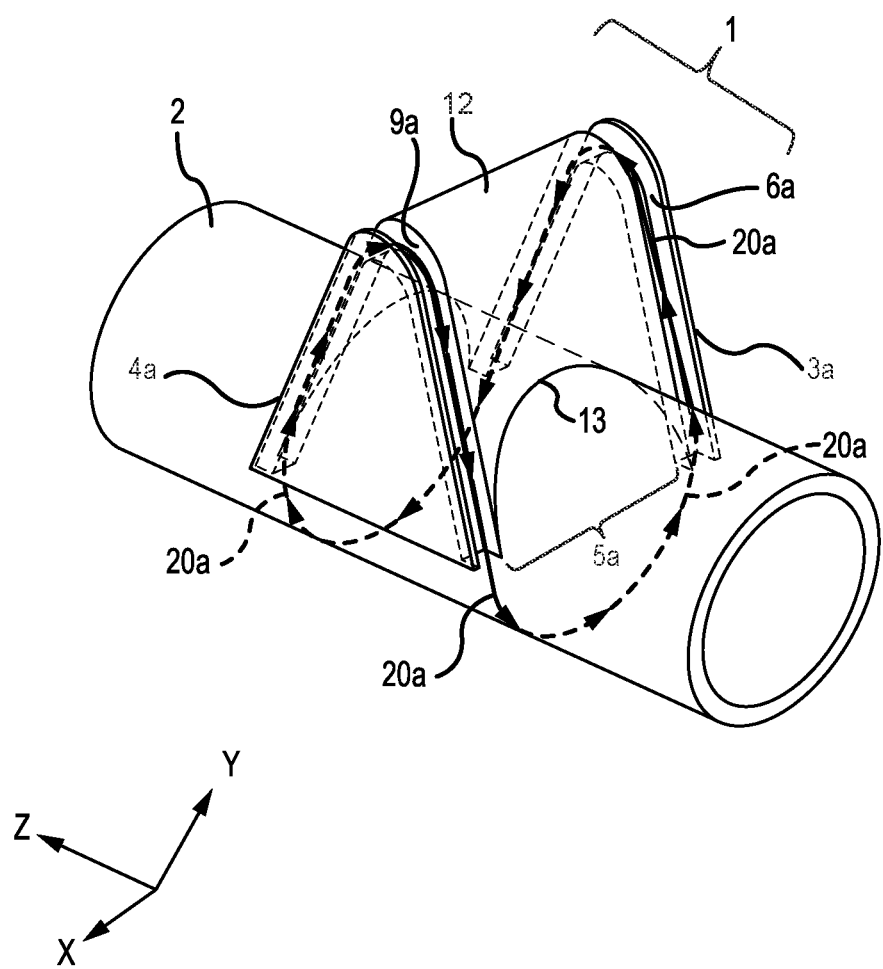
FIGS. 2A-B illustrate lug clusters in the process of being joined to a composite structural tube, in accordance with various embodiments.
Figure 2B:
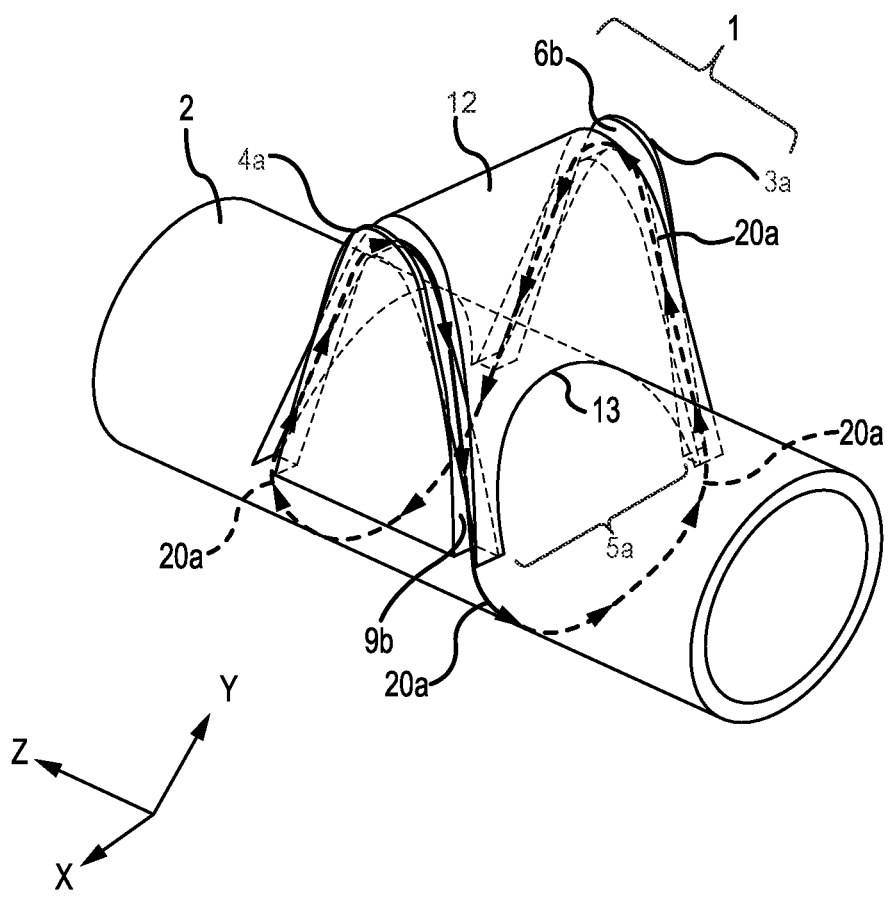
Figure 2C:
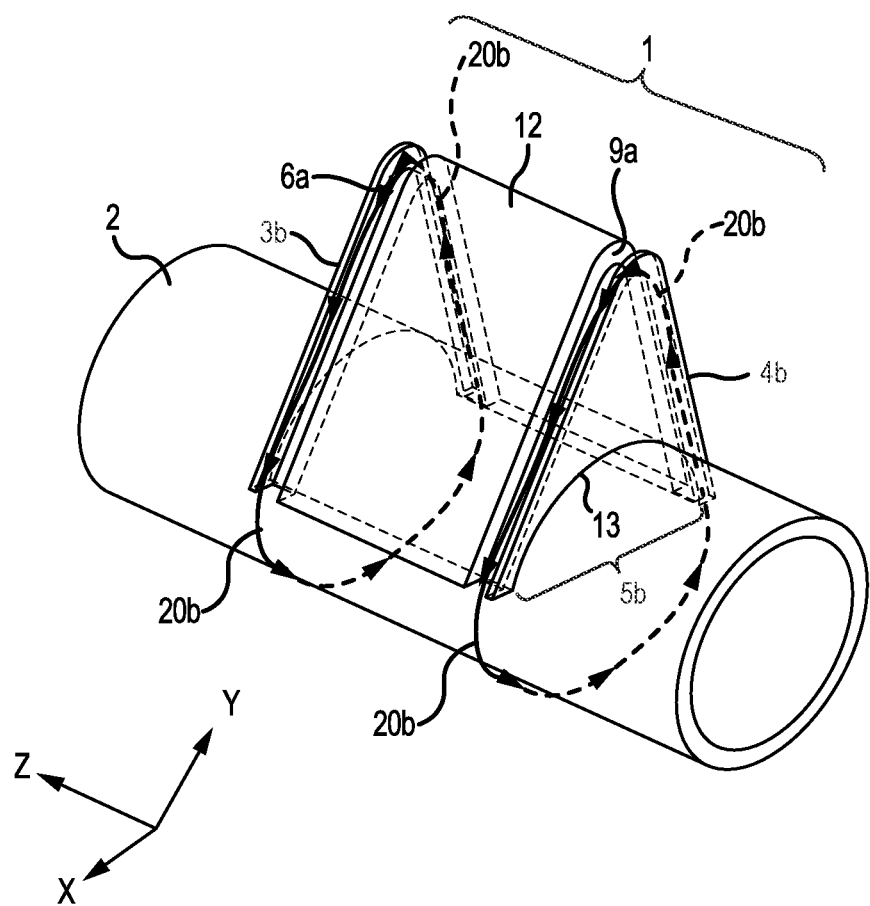
FIG. 2C illustrates a lug cluster aligned in a co-axial orientation and in the process of being joined to a composite structural tube, in accordance with various embodiments.
Figure 3F:
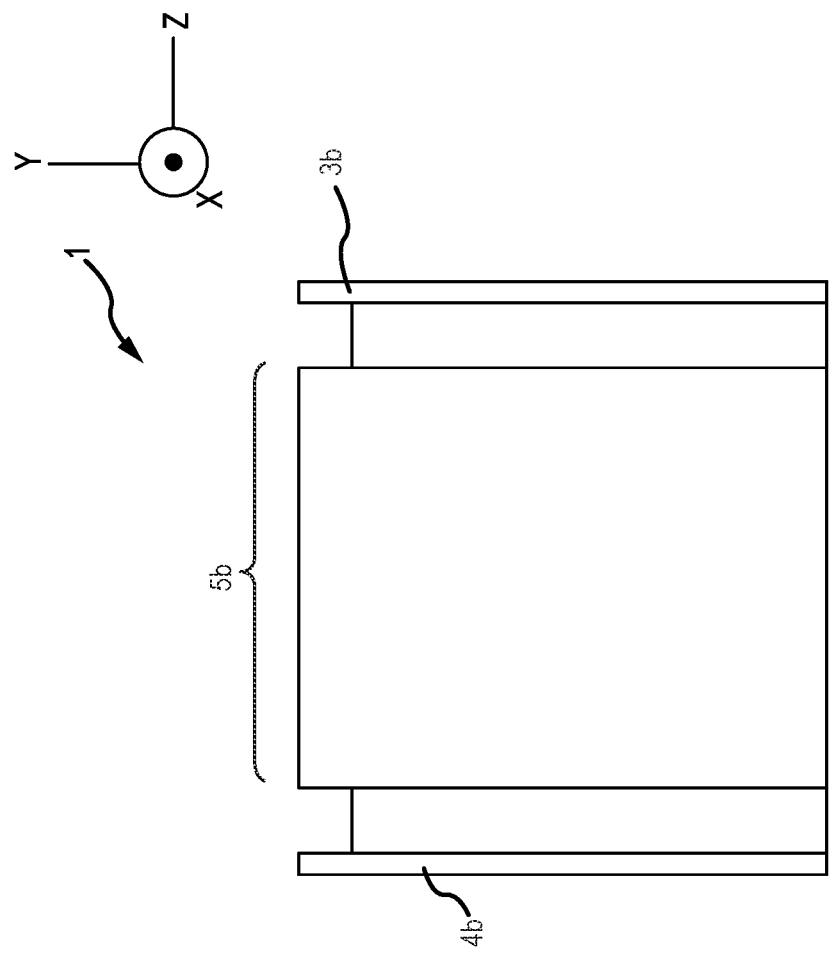
FIGS. 3E-H illustrate various views of various lug clusters according to FIG. 2C.
Figure 3E:
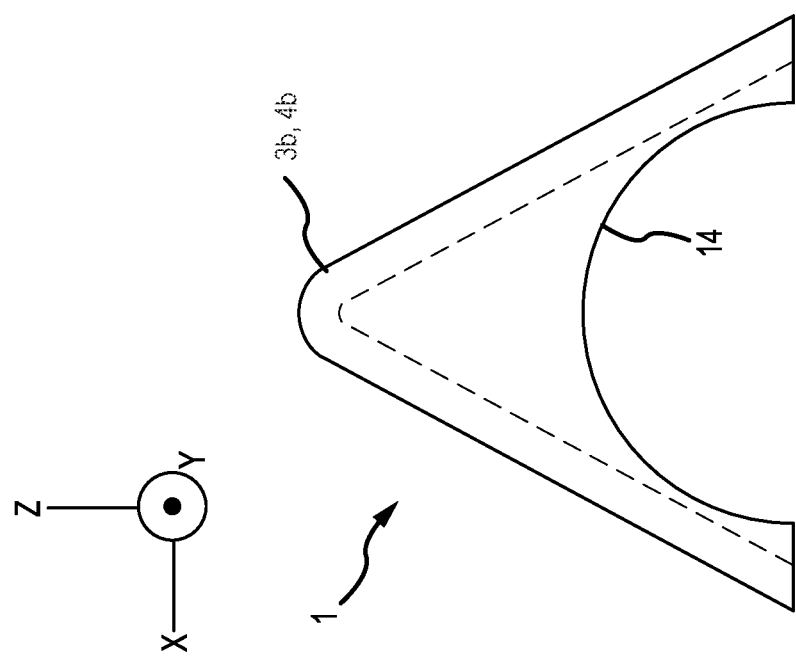

With reference to FIGS. 2C, 3E, and 3F, a lug cluster 1 may comprise a first side 3b, a second side 4b and a saddle 5b. The saddle 5b may rest in surface-to-surface contact against the outer surface of the tube 2 forming a cylinder section with a profile lying in the X-Y plane and an axis extending in the Z-direction. The first side 3b and the second side 4b may be disposed at opposite ends of the saddle 5b along the Z-axis and may extend outwardly from the saddle 5b along Y-axis and lying in the X-Y plane.

Figure 3H:
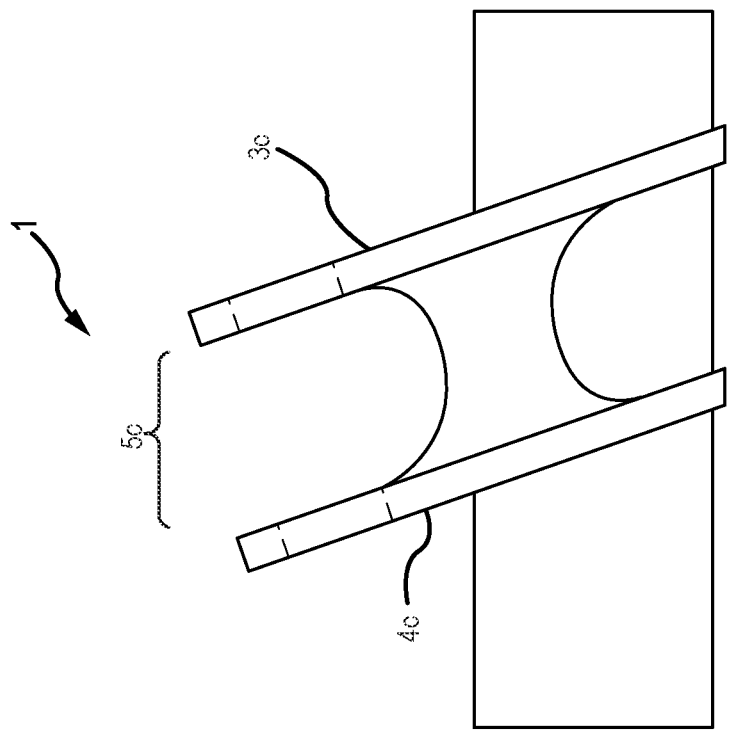
Figure 3G:
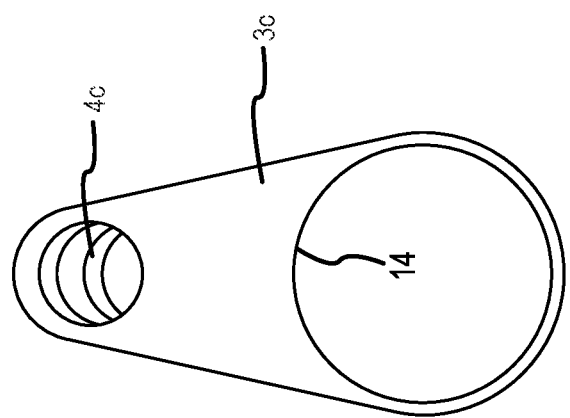

With reference to FIGS. 3G-H, a lug cluster 1 may comprise a first side 3c, a second side 4c and a saddle 5c. The saddle 5c may rest in surface-to-surface contact against the outer surface of the tube 2 forming a cylinder section with a profile lying in the X-Y plane and an axis extending in the Z-direction. The first side 3c and the second side 4c may be disposed at opposite ends of the saddle 5c along the Z-axis and may extend outwardly from the saddle 5c along Y-axis and lying in the X-Y plane. In various embodiments, the first side 3c and the second side 4c extend away from the surface of the tube 2 at a relative angle to the surface of the tube.

With reference to FIGS. 2-3H, the first side 3a, 3b, 3c and the second side 4a, 4b, 4c may each have a shape, such as being generally triangular with a radiused vertex, or trapezoidal, or rectangular, or any shape as desired. In various embodiments, the first side 3a, 3b, 3c and the second side 4a, 4b, 4c have the same shape, while in further embodiments, the first side 3a, 3b, 3c and the second side 4a, 4b, 4c have different shapes, such as, for example, to maintain appropriate clearance from surrounding structures. With reference to FIGS. 3G-H, the first side 3c and the second side 4c may be swept at an angle so as not to extend perpendicularly to the axis of the tube 2, but to extend at an angle to the axis of the tube 2. The first side 3c may extend a greater distance outwardly relative to the tube than the second side 4c.

With reference to FIGS. 2-3H, first side groove 6a or first side groove 6b may comprise a channel disposed in the outer periphery of the first side 3a, 3b, 3c. With reference to FIGS. 2A, 2C, 3A-B, and 3E-H, the first side groove 6a may penetrate into the first side 3a, 3b, 3c, outwardly bounded by a portion of the first side. With reference to FIGS. 2B, and 3C-D, the first side groove 6b may comprise a helical portion. The helical portion may comprise a portion wherein the penetration into the first side 3a, 3b, 3c shifts from one face of the first side 3a, 3b, 3c to another face of the first side 3a, 3b, 3c, so that a part of the helical portion is not outwardly bounded by the first side 3a, 3b, 3c, but rather extends into the first side 3a, 3b, 3c according to a helical path. Thus, the helical portion may follow the outer periphery of the first side 3a, 3b, 3c, but may also at least partially extend through the outer periphery of the first side 3a, 3b, 3c. The channel may have an arcuate profile. In further embodiments, the channel may have a trapezoidal profile, or a triangular profile, or may comprise any profile as desired.

Similarly, with reference to FIGS. 2-3H, second side groove 9a or second side groove 9b may comprise a channel disposed in the outer periphery of the second side 4a, 4b, 4c. With reference to FIGS. 2A, 2C, 3A-B, and 3E-H, the second side groove 9a may penetrate into the second side 4a, 4b, 4c, outwardly bounded by a portion of the second side. With reference to FIGS. 2B, and 3C-D, the second side groove 9b may comprise a helical portion. The helical portion may comprise a portion wherein the penetration into the second side 4a, 4b, 4c shifts from one face of the second side 4a, 4b, 4c to another face of the second side 4a, 4b, 4c, so that a part of the helical portion is not outwardly bounded by the second side 4a, 4b, 4c, but rather extends into the second side 4 according to a helical path. Thus, the helical portion may follow the outer periphery of the second side 4a, 4b, 4c, but may also at least partially extend through the outer periphery of the second side 4a, 4b, 4c. The channel may have an arcuate profile. In further embodiments, the channel may have a trapezoidal profile, or a triangular profile, or may comprise any profile as desired.

With reference to FIGS. 2A-3H, the first side may comprise a first side groove 6a, 6b and the second side may comprise a second side groove 9a, 9b. A fiber filament may be wrapped around the first side groove 6a, 6b and the second side groove 9a, 9b according to a filament path 20a, 20b. The fiber filament may be an individual strand of fiber, or may be a series of strands of fiber on a flat tape, or any filament as desired. The fiber filament may be a continuous fiber, or may be discontinuous fibers. A fiber filament may be wrapped along first side groove 6a, 6b, around the tube 2, through second side groove 9a, 9b, around the tube 2, and back to the first side groove 6a, 6b. The fiber filament may be wrapped in other direction, and/or wraps may cross under the tube 2. While in various embodiments, a continuous fiber is wrapped along the first side groove 6a, 6b and second side groove 9a, 9b, in further embodiments (such as with reference to FIG. 2C illustrating a filament path 20b) separate fibers are wrapped along the first side groove than are wrapped along the second side groove.

With reference to FIGS. 1-4C, saddle 5a, 5b, 5c may comprise floor member 13. Floor member 13 may comprise a generally planar member that is formed to follow a contour of the tube 2. For instance, floor member 13 may have a profile corresponding to a partial circumference of the tube 2. Floor member 13 may be disposed between the first side 3a, 3b, 3c and the second side 4a, 4b, 4c and may join the first side 3a, 3b, 3c and the second side 4a, 4b, 4c. In various embodiments, the floor member 13 comprises a tube contour edge 14 (e.g., see FIG. 3A). A tube contour edge 14 may comprise an arc configured to follow the arc of a surface of the tube 2. In various embodiments, the floor member 13 has a profile corresponding to a partial circumference of the tube 2 that is less than ½ of the circumference of the tube 2. In various embodiments, the floor member 13 has a profile corresponding to a partial circumference of the tube 2 that is equal to ½ of the circumference of the tube 2. In various embodiments, the floor member 13 has a profile corresponding to a partial circumference of the tube 2 that is > than ½ of the circumference of the tube 2. In various embodiments, the floor member 13 has a profile corresponding to a partial circumference of the tube 2 that is <=½ of the circumference of the tube 2 or that is >=½ of the circumference of the tube 2. A tube contour edge 14 may be implemented to assist the floor member 13 in laying smoothly in surface-to-surface contact to the tube 2, such as without buckling, wrinkling, and/or the like. Thus, the tube contour edge 14 may comprise a circle section having a radius equal to the radius of the tube 2.

Figure 5A:
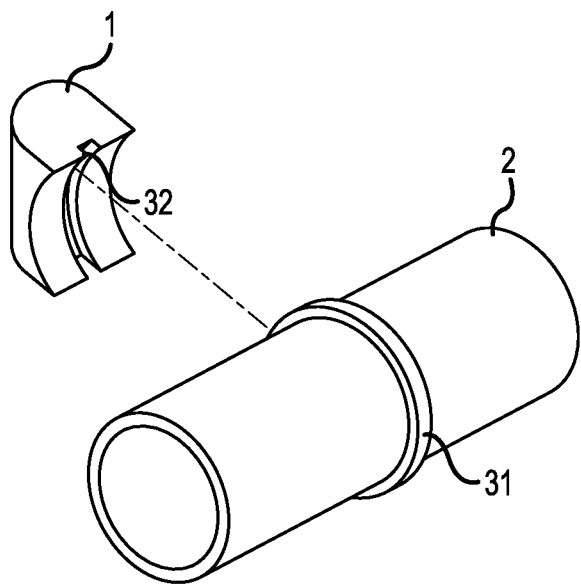
FIGS. 5A-F illustrate various shear features of a lug cluster and a tube, in accordance with various embodiments.
Figure 5B:
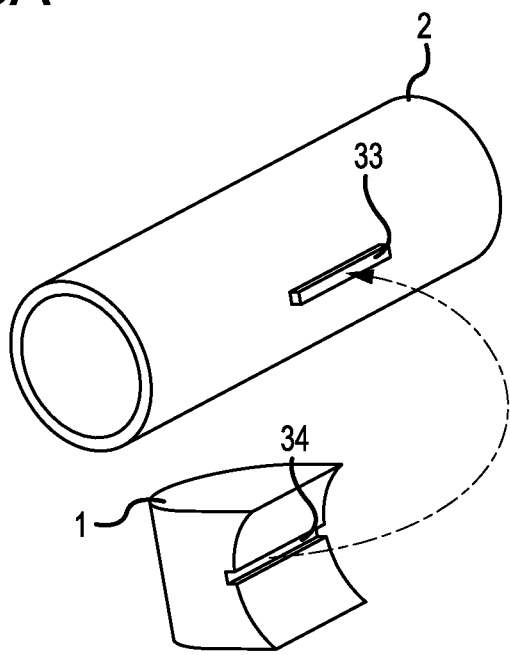
Figure 5C:
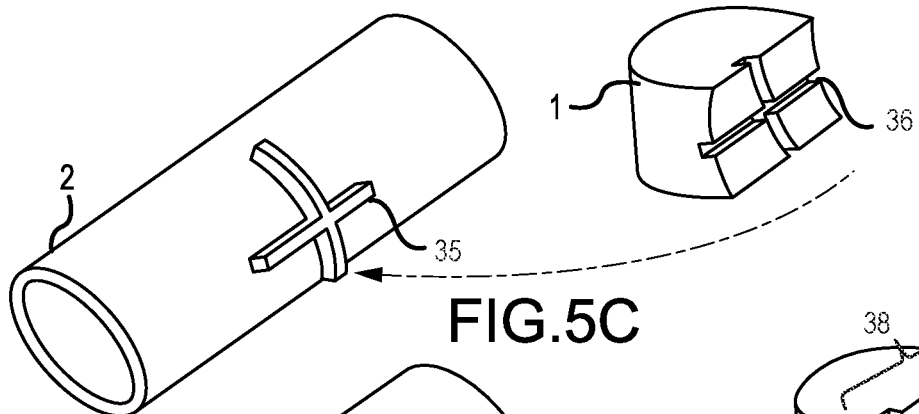
Figure 5D:
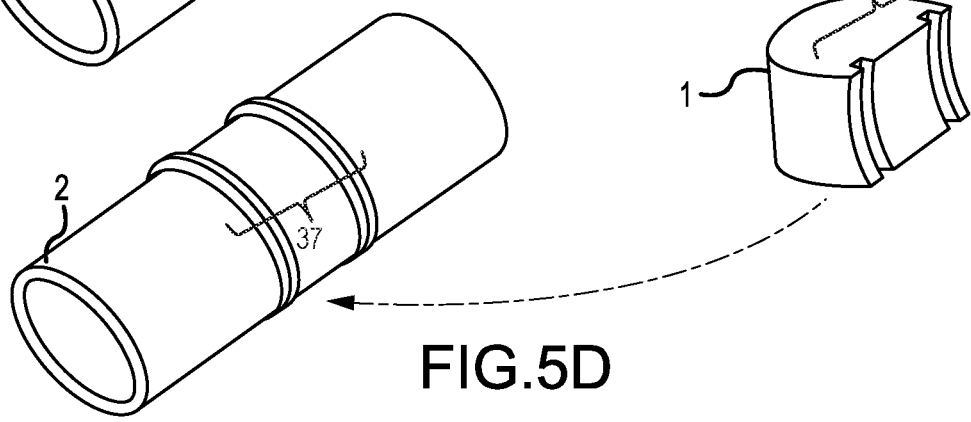
Figure 5E:
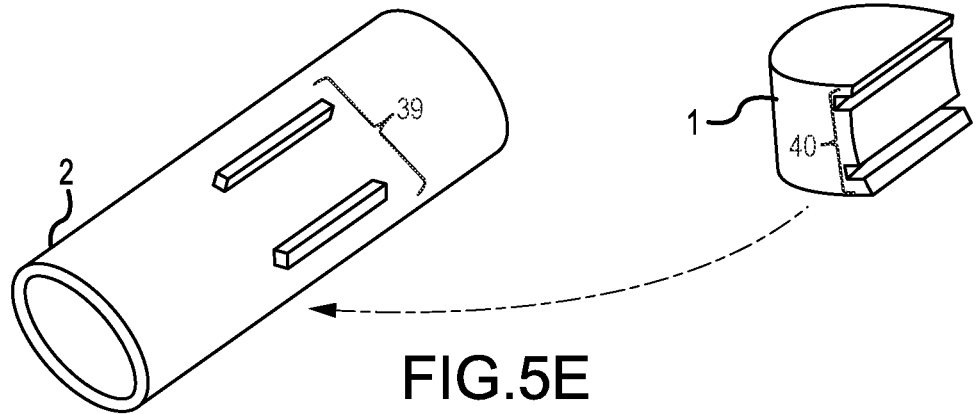
Figure 5F:
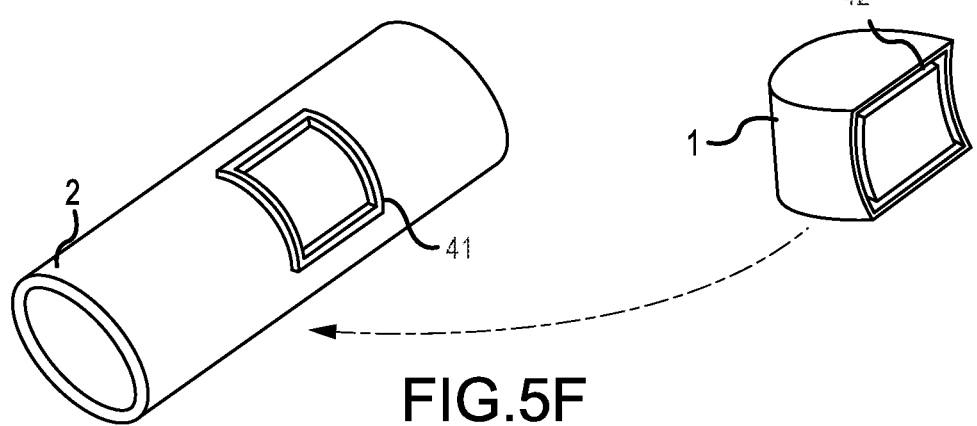

With reference to FIGS. 5A-F, in various embodiments, the lug 1 and the tube 2 may comprise corresponding shear features. For instance, a shear feature may be formed in the lug 1 at the interface of the lug 1 to the tube 2 corresponding to a conjugate shear feature formed in the tube 2 at the interface of the lug 1 to the tube 2. Shear features may comprise tongues and grooves, keys and keyways, abutting ribs, and/or the like. For instance, with reference to FIG. 5A, a shear feature comprising a circumferential tongue 31 is formed in the tube 2 at the interface of the lug 1 to the tube 2 corresponding to a conjugate shear feature comprising a circumferential groove 32 formed in the lug 1 at the interface of the lug 1 to the tube 2. With reference to FIG. 5B, a shear feature comprising an axial tongue 33 is formed in the tube 2 at the interface of the lug 1 to the tube 2 corresponding to a conjugate shear feature comprising an axial groove 34 formed in the lug 1 at the interface of the lug 1 to the tube 2. With reference to FIG. 5C, a shear feature comprising an crossed tongue 35 is formed in the tube 2 at the interface of the lug 1 to the tube 2 corresponding to a conjugate shear feature comprising an crossed groove 36 formed in the lug 1 at the interface of the lug 1 to the tube 2. With reference to FIG. 5D, a shear feature comprising an aligned circumferential groove set 37 is formed in the tube 2 at the interface of the lug 1 to the tube 2 corresponding to a conjugate shear feature comprising an aligned circumferential groove set 38 formed in the lug 1 at the interface of the lug 1 to the tube 2. With reference to FIG. 5E, a shear feature comprising an aligned axial tongue set 39 is formed in the tube 2 at the interface of the lug 1 to the tube 2 corresponding to a conjugate shear feature comprising an aligned axial groove set 40 formed in the lug 1 at the interface of the lug 1 to the tube 2. With reference to FIG. 5F, a shear feature comprising an closed trapezoidal tongue 41 is formed in the tube 2 at the interface of the lug 1 to the tube 2 corresponding to a conjugate shear feature comprising a closed trapezoidal axial groove 42 formed in the lug 1 at the interface of the lug 1 to the tube 2. The shear features may be oriented to ameliorate a tendency of the completed lug 1 to twist around the tube (FIGS. 5B, 5C, 5E, 5F) and/or may be oriented to ameliorate a tendency of the completed lug 1 to translate along the length of the tube (FIGS. 5A, 5C, 5D, 5F). Moreover, in various embodiments, shear features may be introduced to the tube 2 alone, such as to restrain the freedom of the lug 1 to move about the tube 2. For instance, shear features may abut one or more side of the lug 1. In this manner, the integrity of the bond, such as between the lug 1 and tube 2, such as created by resin, may be enhanced. Moreover, shear features and/or other surface features may be included to assist in orientation and alignment of the lug 1 and the tube 2 during assembly, and/or keying of specific lugs 1 to specific sites on the tube 2. In various embodiments, the shear features are formed directly in the lug and/or tube. In further embodiments, the shear features are produced by addition of a shell to the lug 1 and/or tube 2.

Figure 4A:
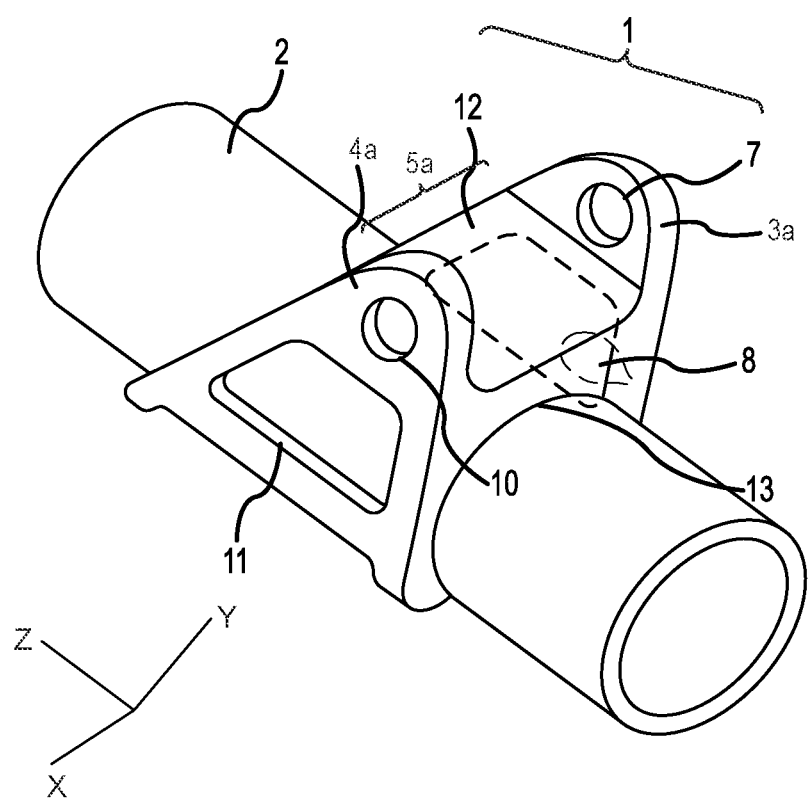
FIG. 4A illustrates a lug cluster finally joined to a composite tube, in accordance with various embodiments.
Figure 4B:
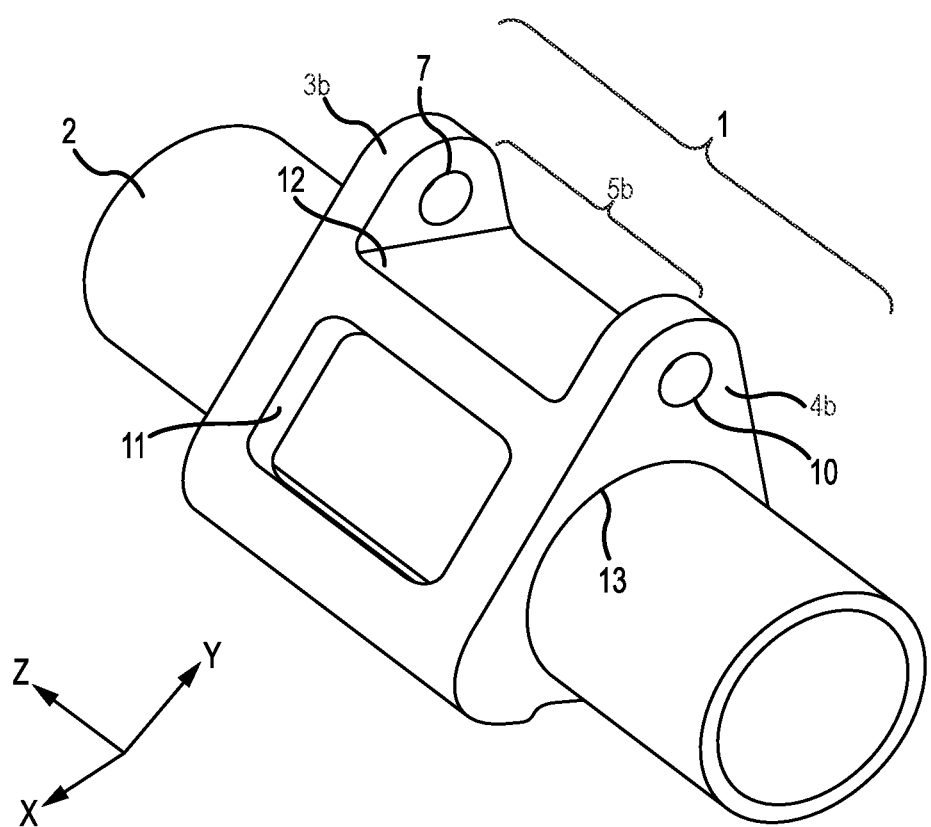
FIGS. 4B-C illustrate lug clusters aligned in a co-axial orientation finally joined to a composite tube, in accordance with various embodiments.
Figure 4C:
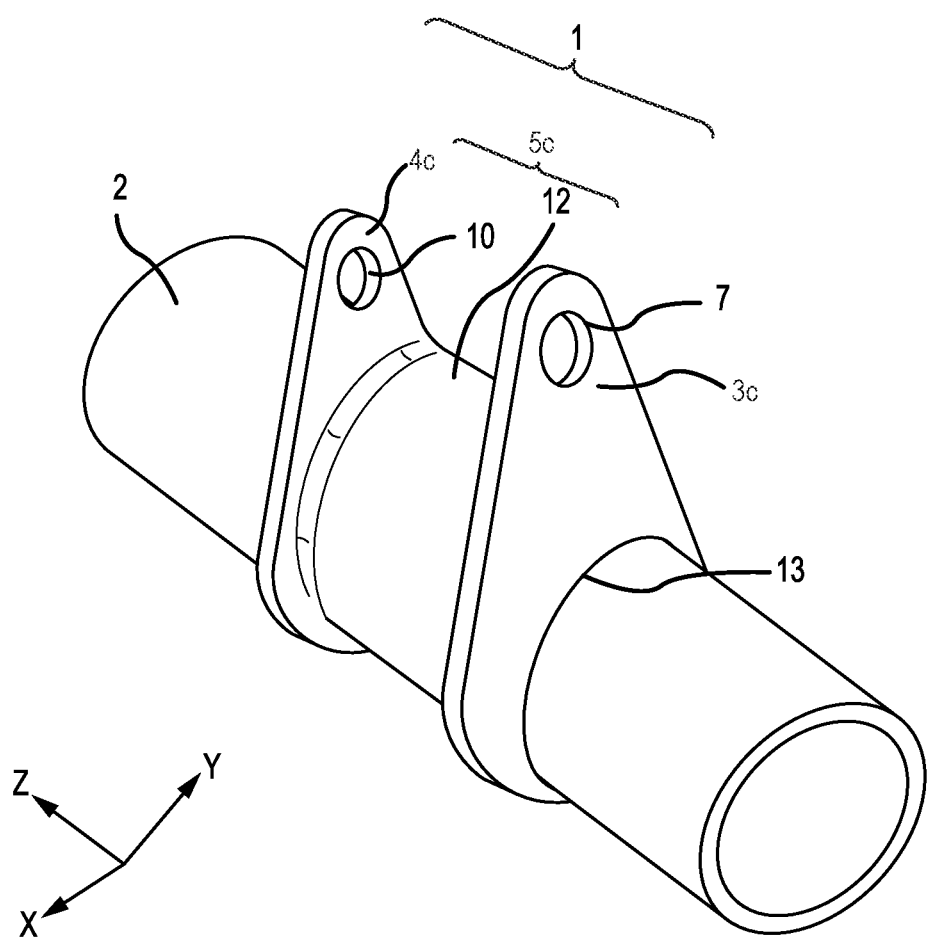

With reference to FIGS. 4A-C, the saddle 5a, 5b, 5c may further comprise an upper infill member 12. An upper infill member 12 may comprise a first material composition forming a boss extending in the Y-axis direction away from the floor member 13 and positioned between the first side 3a, 3b, 3c and the second side 4a, 4b, 4c relative to the X-Z plane (FIG. 4A) or relative to the X-Y plane (FIGS. 4B-C). The upper infill member 12 may be bounded by the projected edge of at least one of the first side 3a, 3b, 3c and the second side 4a, 4b, 4c, and may extend away from the floor member 13 in the Y-axis direction, forming an integral boss.

The first side 3a, 3b, 3c may further comprise a first side attachment point 7. A first side attachment point 7 may be configured to receive a structure desired to be attached to the tube 2 via the lug cluster 1. For instance, a first side attachment point 7 may comprise an aperture formed through and defined by (i.e., bounded by) the first side 3a, 3b, 3c. The aperture may be positioned above the upper infill member 12 (e.g., relatively farther away along the Y-axis relative to the floor member 13). The aperture may be oriented in alignment (e.g., co-axial centers) corresponding with a second side attachment point 10 of the second side 4a, 4b, 4c. The first side attachment point 7 may further comprise a bushing, such as a metallic bushing, a non-metallic bushing, and/or a self-lubricating element.

The second side 4a, 4b, 4c may further comprise a second side attachment point 10. A second side attachment point 10 may be configured to receive a structure desired to be attached to the tube 2 via the lug cluster 1. For instance, a second side attachment point 10 may comprise an aperture formed through and defined by the second side 4a, 4b, 4c. The aperture may be positioned above the upper infill member 12 (e.g., relatively farther away along the Y-axis relative to the floor member 13). The aperture may be oriented in alignment corresponding with a first side attachment point 7 of the first side 3a, 3b, 3c. The second side attachment point 10 may further comprise a bushing, such as a metallic bushing, a non-metallic bushing, and/or a self-lubricating element. With reference to FIG. 4A, the first side attachment point 7 and the second side attachment point 10 may align coaxially, with a shared axis oriented perpendicular to the axis of the tube 2 with which the lug cluster 1 is associated. With reference to FIG. 4B, the first side attachment point 7 and the second side attachment point 10 may align coaxially, with a shared axis oriented parallel to the axis of the tube 2 with which the lug cluster 1 is associated. With reference to FIG. 4C, the first side attachment point 7 and the second side attachment point 10 may align coaxially, with a shared axis oriented at an acute angle having at least a partially parallel vector component to the axis of the tube 2 with which the lug cluster 1 is associated. In further embodiments, the first side attachment point 7 and the second side attachment point 10 may align coaxially, with a shared axis oriented at an obtuse angle having at least a partially parallel vector component to the axis of the tube 2 with which the lug cluster 1 is associated, or any angle as desired.

With reference to FIGS. 4A-B, the first side 3a, 3b, 3c may further comprise a first side lightening pocket 8. A first side lightening pocket 8 may comprise an aperture formed through and defined by the first side 3a, 3b, 3c. The first side lightening pocket 8 may comprise material removed from the first side 3a, 3b, 3c generally aligned with the upper infill member 12.

The second side 4a, 4b, 4c may further comprise a second side lightening pocket 11. A second side lightening pocket 11 may comprise an aperture formed through and defined by the second side 4a, 4b, 4c. The second side lightening pocket 11 may comprise material removed from the second side 4a, 4b, 4c generally aligned with the upper infill member 12.

Having described various structural aspects of a lug cluster 1, methods of making a lug cluster 1 are now disclosed. For instance, the saddle 5a, 5b, 5c may be manufactured. The saddle 5a, 5b, 5c may be used as a tool during subsequent manufacturing steps as well as a structural aspect of the lug cluster 1. The saddle 5a, 5b, 5c may transmit loads from the lug cluster 1 into the tube 2. The saddle 5a, 5b, 5c may have a contour that matches the tube 2 and may be placed on the tube 2 at the desired location. A fiber may be wound over the first side through the first side groove 6a according to the filament path 20a or over the first side through the first side groove 6b according to a filament path 20b. A fiber may be wound over the second side through the second side groove 9a according to the filament path 20a or over the second side through the second side groove 9b according to a filament path 20b. The fiber is wound until there is sufficient volume of fiber to support the desired loading. A tension may be applied to the fiber during the wrapping to achieve integrity of the joint without deforming the tube 2. The wrapping fibers thus compress the tube 2 against the floor member 13 of the saddle 5a, 5b, 5c of the lug cluster 1. As such, the lugs can be mounted to the tube 2 without diminishment of the integrity of the tube 2 structure. The tube 2 and lug cluster 1 may be consolidated using resin transfer molding ("RTM"). Generally, resin transfer molding ("RTM") includes a process where a molding material having a first material composition (e.g., a resin, a thermosetting material, a thermoplastic material, composite, and/or the like) is heated and injected into a mold encasing at least a portion of the lug cluster 1 and the tube 2. The molding material infiltrates and/or encases the lug cluster 1 and hardens. Following RTM and hardening of the resin, the assembly of the tube 2 and lug cluster 1 may be machined to remove excess material of the upper infill member 12 and to finalize features such as the lightening pockets and attachment points.

Figure 6:
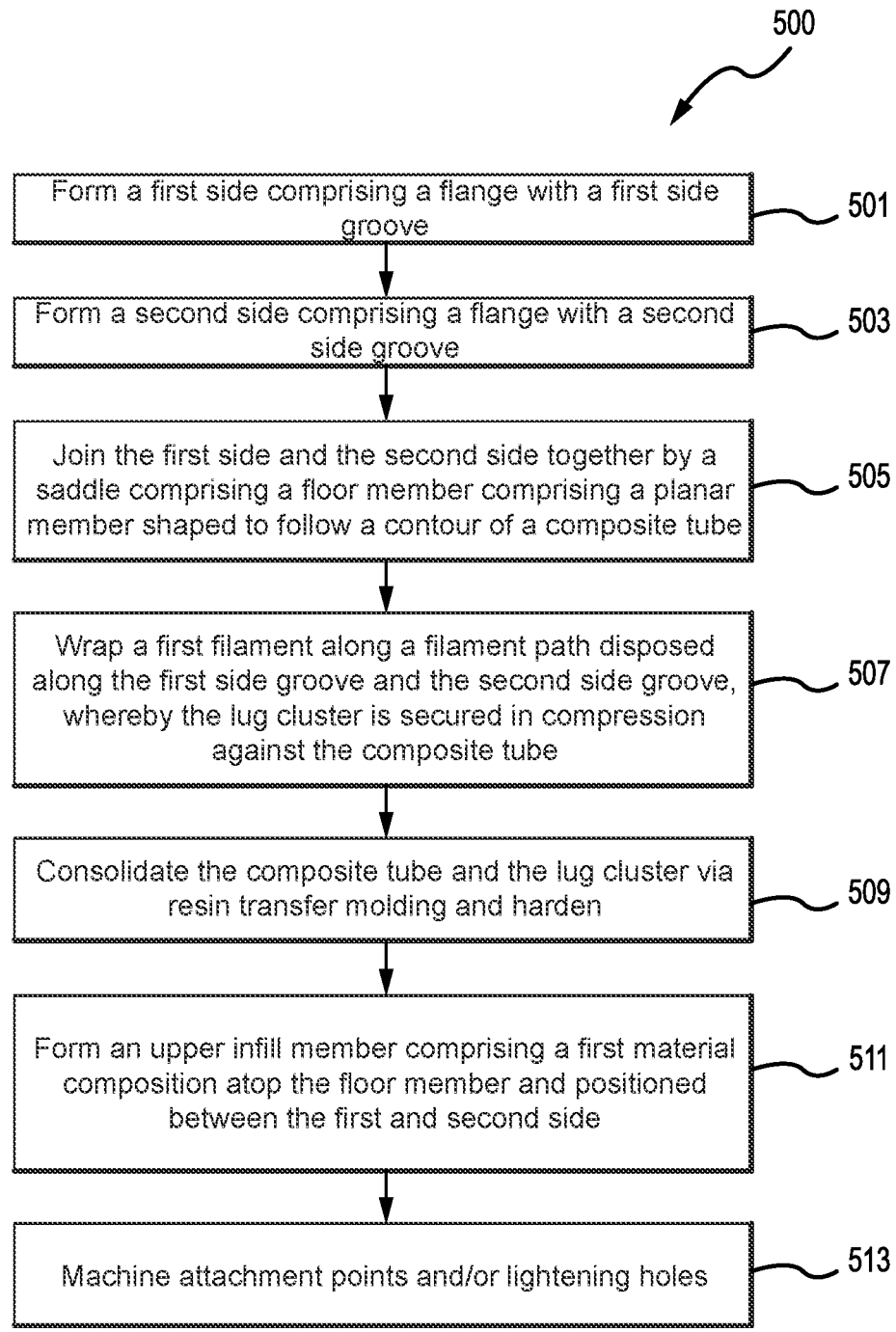
FIG. 6 depicts a method of forming a lug cluster, in accordance with various embodiments.

As such, attention is directed to FIGS. 1-6 with particular emphasis on FIG. 6. A method 500 of manufacturing a lug cluster 1 is disclosed. A first side 3a, 3b, 3c may be formed comprising a flange with a first side groove 6a or a first side groove 6b (Step 501). A second side 4a, 4b, 4c may be formed comprising a flange with a second side groove 9a or a second side groove 9b (Step 503). The first side 3a, 3b, 3c and second side 4a, 4b, 4c are joined together by a saddle 5a, 5b, 5c comprising a floor member 13 comprising a planar member shaped to follow a contour of a composite tube (Step 505). The first side 3a, 3b, 3c, the second side 4a, 4b, 4c, and/or the floor member 13 of the saddle may comprise various materials, such as, for example, metal, composite, plastic, fibrous material, and/or any material having desired properties. A first filament is wrapped along a filament path 20a or a filament path 20b disposed along the first side groove 6a or the first side groove 6b and/or the second side groove 9a or the second side groove 9b, whereby the lug cluster 1 is secured in compression against the composite tube 2 (Step 507). The composite tube and the lug cluster are consolidated, such as via resin transfer molding and hardened (Step 509). Moreover, an upper infill member 12 is formed comprising a first material composition resting on the floor member 13 and positioned between the first side 3a, 3b, 3c and the second side 4a, 4b, 4c (Step 511). Finally, attachment points and/or lightening pockets are machined (Step 513).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear system comprising:
   a composite tube comprising at least one of:
      a filament wound composite tube;
      a filament braided tube; or
      a laid up filament;
   a first lug cluster mounted to the composite tube; and
   a second lug cluster mounted to the composite tube;
   wherein the first lug cluster and the second lug cluster are oriented at an angle to one another; and
   the first lug cluster comprises:
      a first side comprising a first flange comprising a first side groove receiving a first fiber filament according to a first filament path;
      a second side comprising a second flange comprising a second side groove receiving the first fiber filament according to the first filament path; and
      a first saddle comprising:
         a first floor member formed to follow a contour of the composite tube; and
         a first upper infill member resting on the first floor member and positioned between the first side and the second side.

2. The landing gear system according to claim 1, wherein the second lug cluster comprises:
   a third side comprising a third flange comprising a third side groove receiving a second fiber filament according to a second filament path;
   a fourth side comprising a fourth flange comprising a fourth side groove receiving the second fiber filament according to the second filament path; and
   a second saddle comprising:
      a second floor member formed to follow the contour of the composite tube;
      a second upper infill member resting on the second floor member and positioned between the third side and the fourth side.

3. The landing gear system according to claim 2, wherein the composite tube comprises a landing gear strut.

4. The landing gear system according to claim 2, wherein the second lug cluster is secured in compression against the composite tube via the second fiber filament.

5. The landing gear system according to claim 2, wherein the third side groove is disposed in an outer periphery of the third side and the fourth side groove in disposed in an outer periphery of the fourth side.

6. The landing gear system according to claim 1, wherein the first floor member comprises a tube contour edge comprising an arc corresponding to a partial circumference of the composite tube.

7. The landing gear system according to claim 6, wherein the composite tube comprises a first radius, and the tube contour edge comprises a second radius equal to the first radius of the composite tube.

8. The landing gear system according to claim 1, wherein the first lug cluster is secured in compression against the composite tube via the first fiber filament.

9. The landing gear system according to claim 1, wherein the first side groove is disposed in an outer periphery of the first side and the second side groove in disposed in an outer periphery of the second side.

* * * * *